(12) United States Patent
Ki Yeom et al.

(10) Patent No.: US 11,875,263 B2
(45) Date of Patent: Jan. 16, 2024

(54) METHOD AND APPARATUS FOR ENERGY-AWARE DEEP NEURAL NETWORK COMPRESSION

(71) Applicant: NOTA, INC., Daejeon (KR)

(72) Inventors: Seul Ki Yeom, Daejeon (KR); KyungHwan Shim, Daejeon (KR); Myungsu Chae, Daejeon (KR); Tae-Ho Kim, Daejeon (KR)

(73) Assignee: NOTA, INC., Daejeon (KR)

( * ) Notice: Subject to any disclaimer, the term of this patent is extended or adjusted under 35 U.S.C. 154(b) by 0 days.

(21) Appl. No.: 17/742,269

(22) Filed: May 11, 2022

(65) Prior Publication Data

US 2022/0374717 A1    Nov. 24, 2022

(30) Foreign Application Priority Data

May 11, 2021  (KR) .......................... 10-2021-0060862

(51) Int. Cl.
   *G06N 3/082*          (2023.01)
(52) U.S. Cl.
   CPC .................................. *G06N 3/082* (2013.01)
(58) Field of Classification Search
   None
   See application file for complete search history.

(56) References Cited

PUBLICATIONS

Xu, Yuhui, et al. "Trp: Trained rank pruning for efficient deep neural networks." arXiv preprint arXiv:2004.14566 (2020). (Year: 2020).*
Idelbayev, Yerlan, and Miguel A. Carreira-Perpinán. "Low-rank compression of neural nets: Learning the rank of each layer." Proceedings of the IEEE/CVF Conference on Computer Vision and Pattern Recognition. 2020. (Year: 2020).*
Goetschalckx, Koen et al., "Efficiently Combining SVD, Pruning, Clustering and Retraining for Enhanced Neural Network Compression," Proceedings of the 2018 International Workshop on Embedded and Mobile Deep Learning, Munich, Germany, Jun. 15, 2018, pp. 1-6, Association for Computing Machinery.
Korean Office Action dated Oct. 14, 2022, issued in corresponding Korean Patent Application No. KR 10-2021-0060862, filed May 11, 2021, 4 pages.
Yang, Tien-Ju et al., "Designing Energy-Efficient Convolutional Neural Networks using Energy-Aware Pruning," 2017 IEEE Conference on Computer Vision and Pattern Recognition (CVPR), Honolulu, HI, USA, Jul. 21-26, 2017, pp. 5687-5695, IEEE.
Yeom, S-K., et al., "Toward Compact Deep Neural Networks via Energy-Aware Pruning," arXiv:2103.10858v1: Mar. 19, 2021, 11 pages.

* cited by examiner

*Primary Examiner* — Eric Nilsson
(74) *Attorney, Agent, or Firm* — CHRISTENSEN O'CONNOR 1JOHNSON KINDNESS PLLC

(57) ABSTRACT

Disclosed are a method and apparatus for energy-aware deep neural network compression. A network pruning method for deep neural network compression includes measuring importance scores of a network unit by using an energy-based criterion with respect to a deep learning model, and performing network pruning of the deep learning model based on the importance scores.

10 Claims, 4 Drawing Sheets

METHOD AND APPARATUS FOR ENERGY-AWARE DEEP NEURAL NETWORK COMPRESSION

CROSS-REFERENCE TO RELATED APPLICATION

This application is based on and claims priority under 35 U.S.C. 119 to Korean Patent Application No. 10-2021-0060862, filed May 11, 2021 in the Korean intellectual property office, the disclosures of which are herein incorporated by reference in their entireties.

TECHNICAL FIELD

The following description relates to an energy-aware pruning technology.

BACKGROUND OF THE DISCLOSURE

Deep neural networks (DNNs) have achieved great successes in various applications, such as image classification, detection, and semantic segmentation.

However, the DNNs require significant computational costs and storage, making it difficult to deploy them in real-time applications without the support of a high efficiency graphical processing unit (GPU).

In order to address this issue, various network compression methods, such as pruning, quantization, low-rank approximation, and knowledge distillation, are constantly being developed.

Among diverse network compression strategies, network pruning has steadily grown as an indispensable tool that aims to remove the least important subset of network units (i.e., neurons or filters) in a structured or unstructured manner.

For network pruning, it is crucial to decide how to identify an "irrelevant" subset of parameters used for deletion.

In order to identify the "irrelevant" subset, previous research has suggested specific criteria, such as Taylor approximation, a gradient, a weight, layer-wise relevance propagation (LRP), to reduce complexity and computation costs in a network.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

Proposed is an energy-aware pruning method capable of measuring importance scores of filters by using an energy based criterion.

Furthermore, proposed is an energy-aware pruning method capable of quantifying filters into an energy cost by computing nuclear-norm (NN) derived from singular values decomposition (SVD).

According to an embodiment, in a network pruning method executed by a computer device, the computer device includes at least one processor configured to execute computer-readable instructions included in a memory. The network pruning method includes measuring, by the at least one processor, importance scores of a network unit by using an energy-based criterion with respect to a deep learning model, and performing, by the at least one processor, network pruning of the deep learning model based on the importance scores.

According to an aspect, measuring the importance scores may include measuring the importance scores through a decomposition approach for quantifying energy of an output channel in a specific layer of a network of the deep learning model.

According to another aspect, measuring the importance scores may include measuring the importance scores by using singular values decomposition (SVD).

According to still another aspect, measuring the importance scores may include quantifying the network unit into an energy cost by using nuclear-norm (NN) through singular values decomposition (SVD).

According to still another aspect, measuring the importance scores may include flattening and concatenating each of filter maps with respect to all inputs, and searching for a nuclear-norm (NN) value representing the importance score of each filter by applying singular values decomposition (SVD) to the flattened and concatenated filter maps.

According to still another aspect, performing the network pruning may include performing the network pruning through a regularization function for minimizing a difference in energy between a pre-trained model as the deep learning model and a pruned model as the deep learning model with the network pruning applied.

According to an embodiment, a computer device includes at least one processor configured to execute computer-readable instructions included in a memory. The at least one processor is configured to measure importance scores of a network unit by using an energy-based criterion with respect to a deep learning model and to perform network pruning of the deep learning model based on the importance scores.

According to embodiments of the present disclosure, filters can be quantified into an energy cost by computing NN derived from SVD, and thus network complexity can be efficiently reduced.

According to embodiments of the present disclosure, a filter can be removed with the least energy from the entire network through NN-based energy-aware pruning, and the best performance can be guaranteed regardless of a dataset of network architecture.

DESCRIPTION OF THE DRAWINGS

The foregoing aspects and many of the attendant advantages of this disclosure will become more readily appreciated as the same become better understood by reference to the following detailed description, when taken in conjunction with the accompanying drawings, wherein.

DETAILED DESCRIPTION

Figure 1:
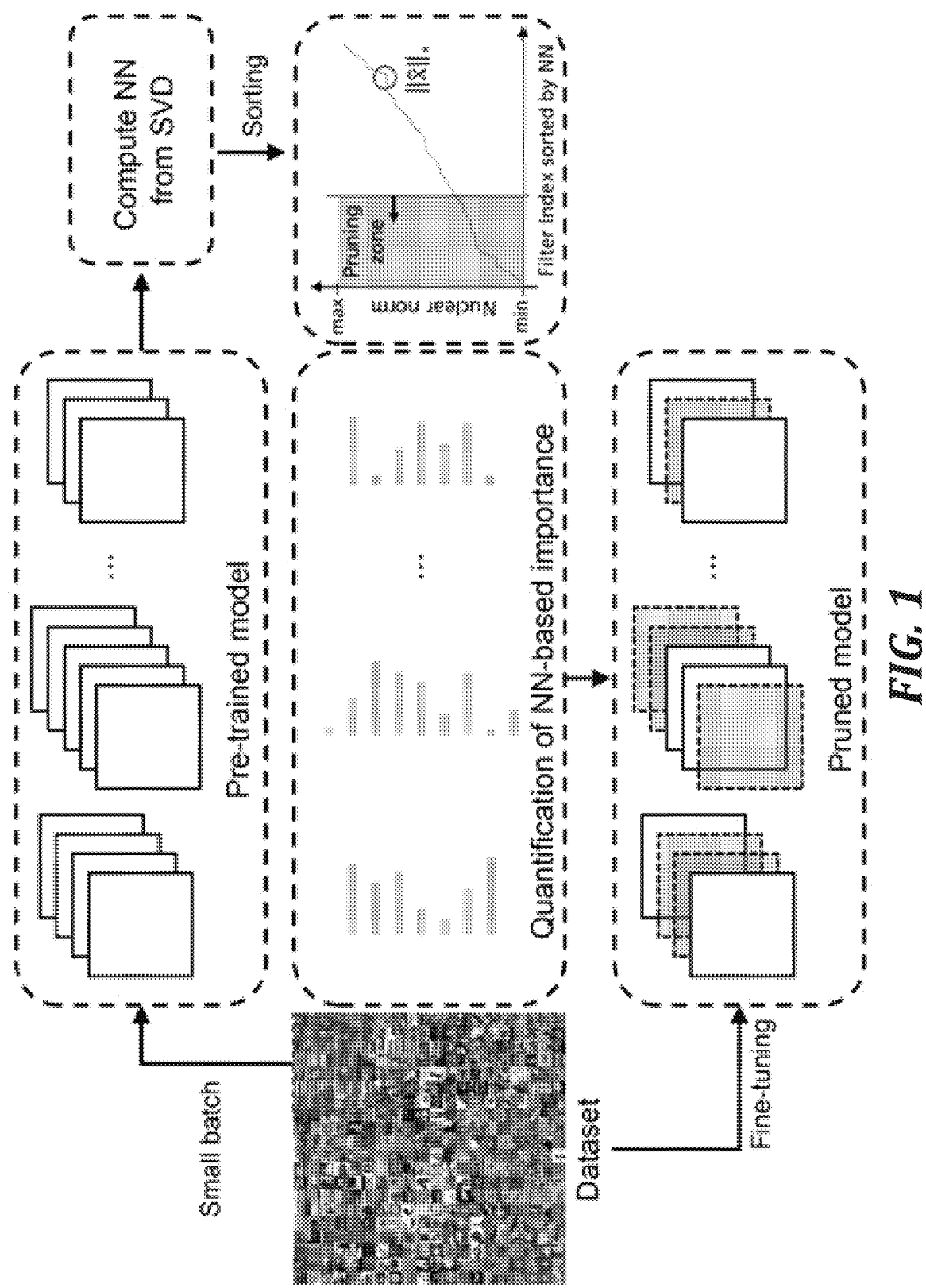
FIG. 1 illustrates an overall framework of an energy-aware pruning process according to an embodiment of the present disclosure.

While illustrative embodiments have been illustrated and described, it will be appreciated that various changes can be made therein without departing from the spirit and scope of the disclosure.

Hereinafter, embodiments of the present disclosure are described in detail with reference to the accompanying drawings.

Embodiments of the present disclosure relate to an energy-aware pruning technology for deep learning model compression.

Embodiments including contents specifically disclosed in this specification may quantify the importance of a network unit (neuron or filter) by using nuclear-norm (NN) and thus can efficiently reduce network complexity with the least energy in the entire network.

Related research is as follows.

Filter Decomposition

Filter decomposition approaches can reduce a computation cost of a network, such as SVD, CP decomposition, and Tucker decomposition, by decomposing network matrices into several bases for vector spaces in order to estimate informative parameters of DNNs with low-rank approximation/factorization, and approximate convolutional operations by representing a weight matrix as a smaller base set of two-dimensional (2D)-separable filters without changing the original number of filters. Principal component analysis (PCA) is applied to max-pooled and flattened feature maps in order to compute the amount of information to be preserved in each layer among all layers, enabling the maps to be integrated with each other.

Filter Pruning

Network filter pruning is a technique for removing redundant or non-informative filters which are less informative for performance from a given model through one-shot pruning or iterative pruning. Most of network filter pruning techniques make filters sparse by removing connections between filters and adopt an appropriate criterion for discriminating whether a connection is crucial or not. Obviously, it is a critical point to decide how to quantify the importance of filters in the current state of a model for deletion. Pruning criteria are determined based on a Taylor approximation, a gradient, a weight, or layer-wise relevance propagation.

Pruning by Decomposition

There is a growing interest in a DNN compression scheme using decomposition in terms of pruning. Due to a close connection between two compression methods, a decomposition-based approach can enhance pruning performance in model compression even in a filter level.

Some research suggests a hardware-friendly CNN model compression framework, and performs the sharing of a small number of basis kernels, adaptive bases, and coefficients with sparse constraints by applying filter decomposition.

Other research suggests a unified framework that allows to combine the pruning approach and the decomposition approach simultaneously by using group sparsity.

Other research suggests trained ranking pruning (TRP) which integrates a low-rank approximation and regularization into a training process. In order to constrain a model into a low-rank space, stochastic sub-gradient descent-optimized nuclear-norm (NN) regularization is used.

Other research suggests a high rank-based pruning method as a criterion by computing a full rank of each feature map from an SVD layer-by-layer, which leads to an inconsistent rank order regardless of batch size.

The present embodiments relate to a new energy-aware pruning method capable of quantifying the importance of a network filter by using nuclear-norm (NN) as a decomposition-based approach.

The present embodiment can measure the importance scores of filters by using an energy-based criterion, and in particular, can efficiently and intuitively quantify a network filter into an energy cost by computing NN derived from singular values decomposition (SVD).

It is important to consider the size of a singular value, that is, the importance of each dimension, as a pruning criterion. The size of a singular value may be represented as an NN value indicative of total energy of filters.

FIG. 1 illustrates an overall framework of an energy-aware pruning process according to an embodiment of the present disclosure.

Referring to FIG. 1, after each filter map is flattened and concatenated with respect to all inputs, an NN value indicative of the importance score of a corresponding filter is searched for by applying SVD.

In other words, each filter may be quantified into an energy cost by computing NN for each filter map.

Thereafter, a pruning process may be performed based on the importance scores of each filter in an order computed with respect to each layer.

Figure 2:
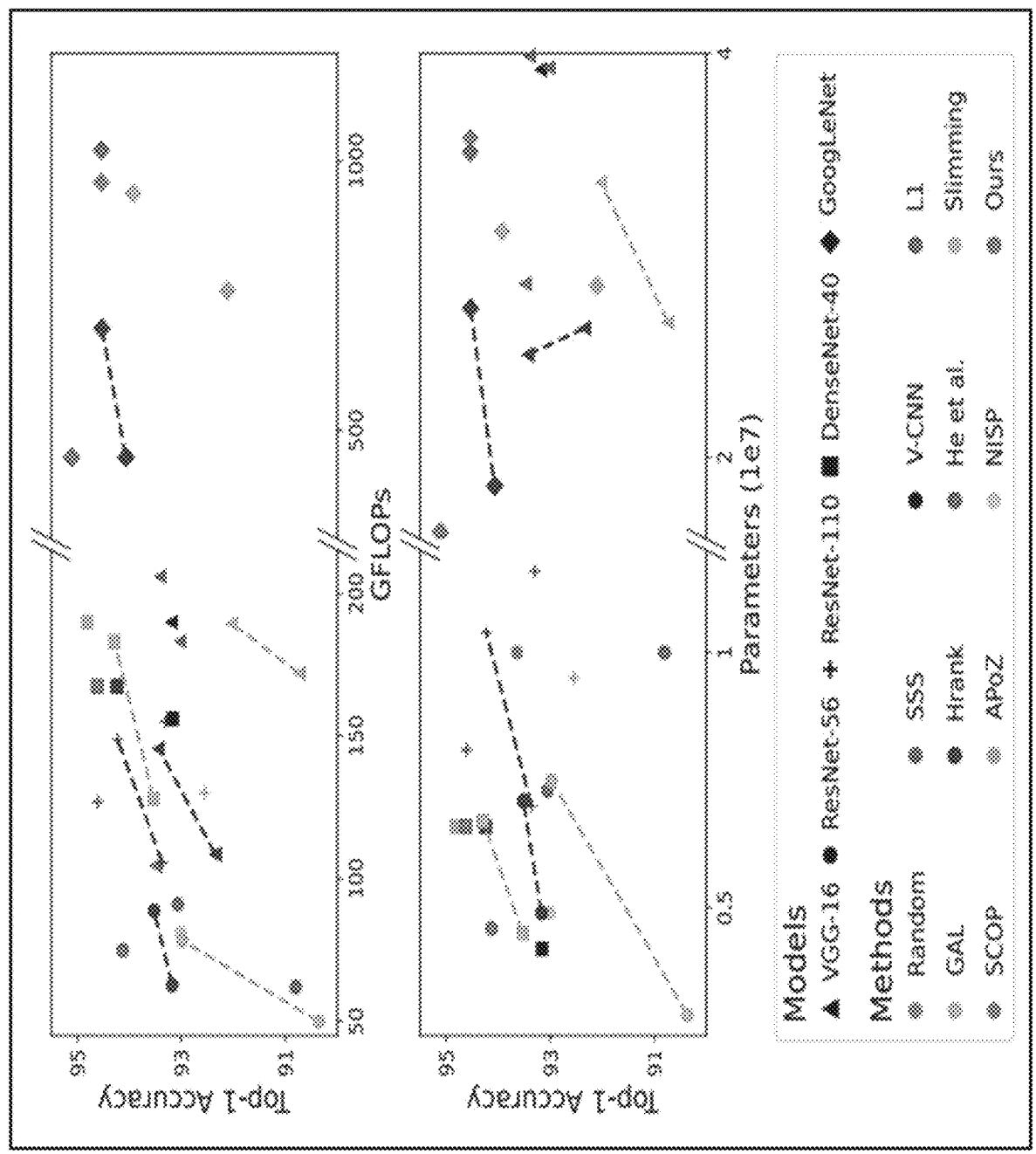
FIG. 2 illustrates results of a comparison between GFLOPs for each network for a dataset and results of a comparison between the numbers of parameters left for each network.

FIG. 2 illustrates results of a comparison between GFLOPs and the numbers of parameters left by using five types of network architecture with respect to a dataset. An upper side on the left of FIG. 2 shows better performance.

Referring to FIG. 2, it may be seen that an NN-based energy-aware pruning scheme of the present disclosure achieves high performance at a similar compression ratio compared to all types of pruning approaches.

Furthermore, the NN-based energy-aware pruning scheme may derive high stability for the quality and amount of data, and will be a great benefit to a practical industry aspect.

An energy-aware pruning method according to an embodiment of the present disclosure is specifically described as follows.

In a pre-trained CNN model, first, trainable parameters and weights are defined as $W_l = \{w_l^1, w_l^2, \ldots, w_l^{c_l}\} \in \mathbb{R}^{c_l \times c_{l-1} \times k \times k}$. In this case, $c_{l-1}$ and $c_l$ indicate the number of input and output channels, and k is the height/width of a squared kernel in an l-th convolution layer. In this case, a deflection condition is omitted for simplicity.

Pruning is started with an over-parameterized pre-trained full-size network $f(\chi; W)$ over the entire network.

In the case of a DNN, an original objective function of the present disclosure is to minimize a loss of a given dataset and a parameter W.

$$\min_W \mathcal{L}(\mathcal{Y}, f(\mathcal{X}; W)) \quad \text{[Equation 1]}$$

wherein $\chi \in \{x_0, x_1, \ldots, x_N\}$ and $y \in \{y_0, y_1, \ldots, y_N\}$ indicate a set of train inputs and a set of its labels which form respective pairs. N denotes the total number of batches.

In order to obtain structured pruning, sparsity regularization may be defined as in Equation 2 by being added to Equation 1.

$$\min_W \mathcal{L}(\mathcal{Y}, f(\mathcal{X}; W)) + \lambda \mathcal{R}(W) \quad \text{[Equation 2]}$$

wherein R denotes a sparsity regularization function, and λ indicates a regularization factor. In this case, a main issue of the pruning is how to define an R function under the given constraints.

In the present embodiment, the R function may be defined by adopting an energy-aware pruning criterion. A hypothesis of energy-aware pruning according to an embodiment of the present disclosure is that the more energy a filter has, the larger amount of information the filter contains. In other words, the present disclosure may define a regularization function capable of minimizing a difference in energy between a pre-trained model as an input deep learning model and a pruned model as the input deep learning model with pruning applied. Accordingly, in terms of energy efficiency, the sparsity regularization function R in Equation 2 may be defined as follows.

$$\mathcal{R}(W)=|E(\chi;W)-E(\chi;W')| \quad \text{[Equation 3]}$$

Wherein $E(\cdot)=\{e_1, e_2, \ldots, e_l\}$ denotes the total amount of energy in the network. Furthermore, each $e_l$ denotes the amount of energy at a layer l and is computed on a corresponding feature map by using the pruning criterion.

Furthermore, in the present embodiment, when M is vectorized, whether a filter remains or is pruned during feed-forward propagation is determined by introducing $M \in \{0,1\}^{c_l}$.

Furthermore, $W' = W \odot M$ is an element-wise multiplication between W and M. In the present embodiment, it is assumed that each $e_l$ may be approximated by $e_l \approx |w_l|*$ computed by the decomposition approach. In this case, SVD, that is, a decomposition approach, is adopted in order to quantify filter-wise energy consumption.

SVD is the basis for many related techniques in a dimensionality reduction, which are used to obtain reduced order models (ROMs). In the case of pruning, SVD helps finding the best k-dimensional perpendicular subspace with respect to a dataset in each point. Especially, a singular value plays an important role in an algebraic complexity theory. That is, the singular value represents energy of each I rank matrix. The singular value represents the importance of its associated I rank matrix.

Filter pruning and decomposition are highly related from a viewpoint of compact tensor approximation. There is a hinge point between two strategies in investigating a compact approximation of tensors despite the usage of different operations in a variety of application scenarios. Decomposition is performed in order to quantify energy of output channels in batch normalization (BN) layers. A BN layer is specified as a layer for measuring importance scores, but the present disclosure is not limited thereto. According to embodiments, other layers, such as a convolutional layer and an activation layer, may also be applied.

In addition to the efficient tradeoff of channel-level sparsity, BN provides normalized values of internal activation by using mini-batch statistics to any scale. This process is achieved by applying 3D filters $\hat{x}_l \in \mathbb{R}^{c \times h \times w}$ In this case, h and w denote the height and width of an I-th BN layer, respectively. The superscript l in Wl is omitted for readability. In the present disclosure, first, an original 3D tensor is reshaped into a 2D tensor $\hat{x} \in \mathbb{R}^{c \times hw}$ based on $\hat{x}$.

In SVD, the channel output of the l-th layer may be decomposed as follows.

$$\hat{x} = USV^T = \sum_{i=1}^{N} \sigma_i u_i v_i^T \quad \text{[Equation 4]}$$

wherein U and V denote left and right singular vector matrices, respectively, and S indicates a diagonal matrix of singular values $\sigma_n$ where $S = \text{diag}(\sigma_1, \sigma_2, \ldots, \sigma_N)$.

$$\|\hat{x}\|_* = \sum_{i=1}^{N} \sigma_i \quad \text{[Equation 5]}$$

$\|\hat{x}\|*$ denotes a nuclear-norm (NN) value, that is, the sum of singular values which may represent energy of the model. In this case, based on the hypothesis of the present disclosure, a useful rule for efficient filter pruning is to optimally preserve energy throughout the network. In this respect, based on Equation 5, not only a distribution can be evaluated, but also the contribution of feature spaces applicable to a pruning criterion can be estimated simultaneously. Additionally, necessary and sufficient conditions for rank consistency are provided while minimizing a loss of the model. Accordingly, consistent results can be obtained regardless of data quality as well as data quantity.

A procedure based on the energy-aware pruning method according to an embodiment of the present disclosure is the same as an algorithm 1 in Table 1.

TABLE 1

| Algorithm 1 Energy-Aware Pruning |
|---|
| 1: Input: pre-trained model f, training data X, pruning ratio r, and pruning threshold t |
| 2: while t not reached do |
| 3:   // Assess network substructure importance; |
| 4:   for all BN layer in f do |
| 5:     for all channels in BN layer do |
| 6:       ▷ compute equation 4 and 5 |
| 7:     end for |
| 8:   end for |
| 9:   // Identify and remove least important filters in groups of r; |
| 10:   ▷ remove r channels with the lowest $\|\hat{x}\|_*$ from f |
| 11:   ▷ remove its corresponding connections of each removed channel |
| 12:   if desired then |
| 13:     // Optional fine-tuning to recover performance; |
| 14:     ▷ fine-tune f' on X |
| 15:   end if |
| 16: end while |
| 17: return pruned model f' |

Figure 3:
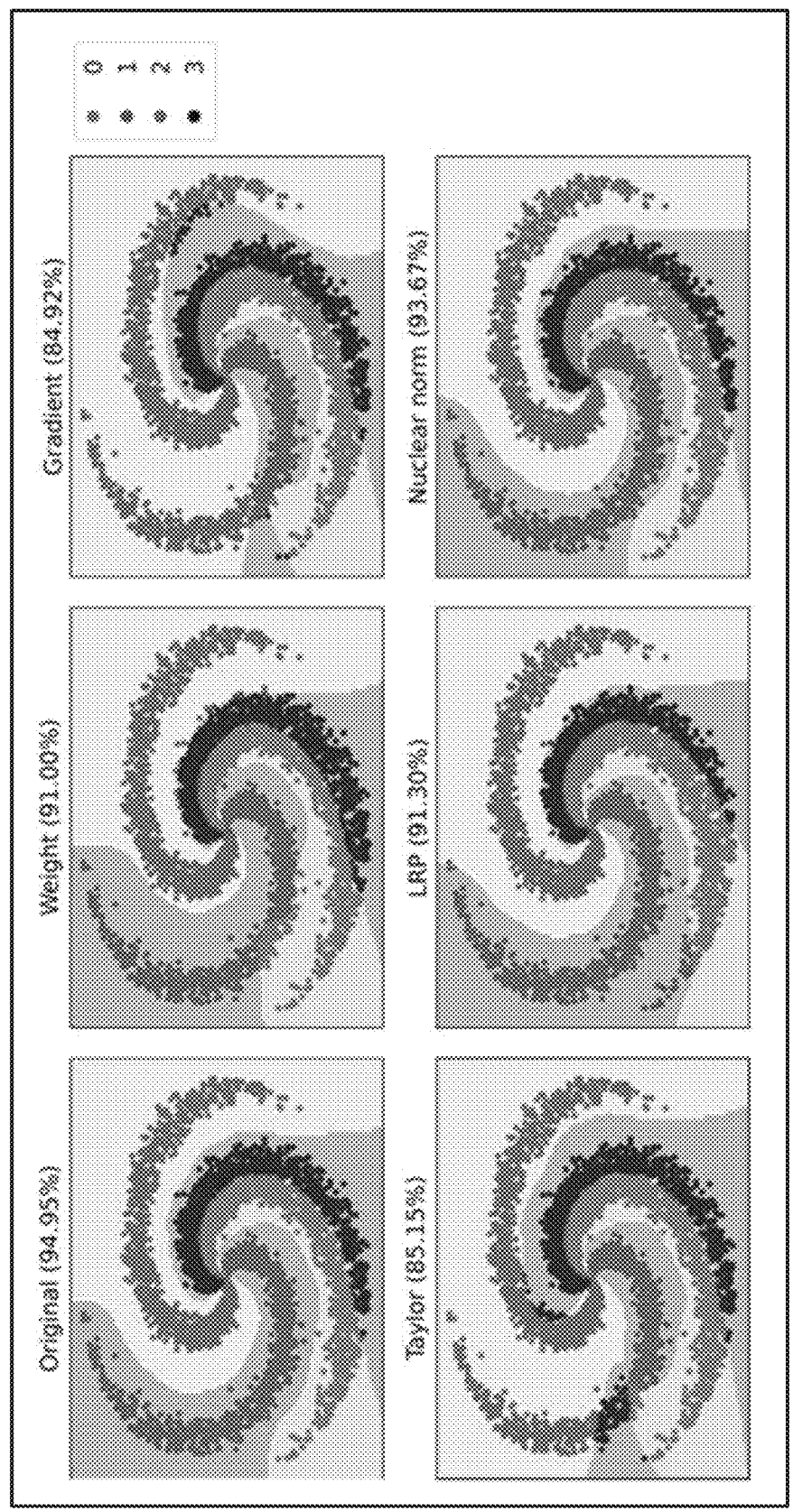
FIG. 3 illustrates results of a comparison between influences on a decision-making function using a toy dataset for each pruning criterion.

FIG. 3 illustrates a data distribution of a multi-class toy dataset generated in order to check a qualitative effect for a decision boundary of the model when a selected neuron set is pruned among pruning criteria.

FIG. 3 illustrates results of a comparison between influences on a decision-making function using a toy dataset for each pruning criterion.

It can be seen that Taylor and gradient measures degrade the model significantly, whereas weights and LRP preserve the decision boundary from the pruned models reasonably except for an area where classifies between Class No. 0 and Class No. 2 and between Class No. 0 and Class No. 3.

Meanwhile, it may be clearly seen that in contrast to other property importance based pruning criteria, the present disclosure can safely remove unimportant elements by significantly classifying multi-classes even after the pruning process. As may be seen from FIG. 3, NN-based pruning results in only a minimal change in the decision boundary, compared to other criteria.

Figure 4:
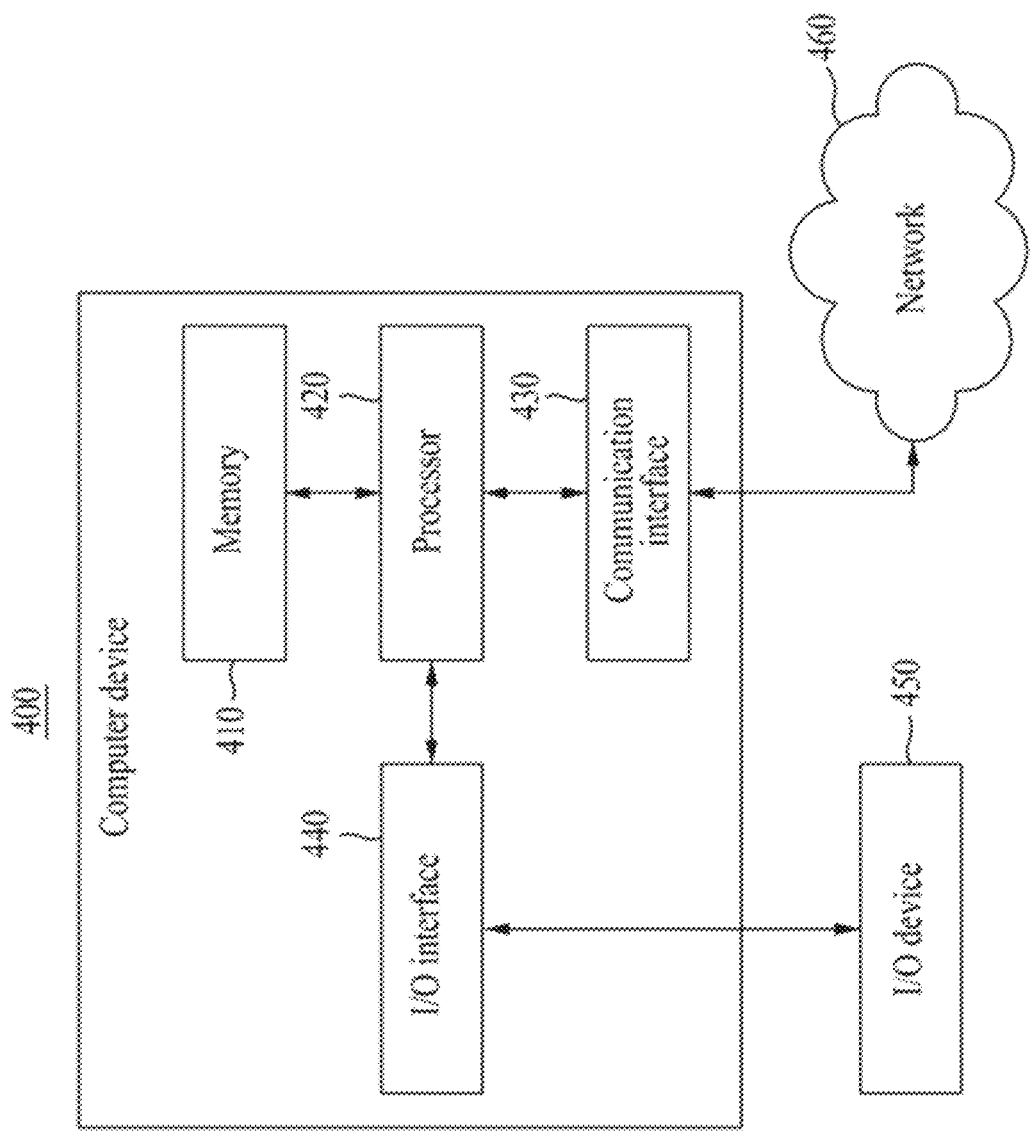
FIG. 4 is a block diagram illustrating an example of a computer device for performing an energy-aware pruning method in an embodiment of the present disclosure.

FIG. 4 is a block diagram illustrating an example of a computer device according to an embodiment of the present disclosure. The energy-aware pruning method according to an embodiment of the present disclosure may be performed by a computer device 400 constructed as in FIG. 4.

As illustrated in FIG. 4, the computer device 400 may include a memory 410, a processor 420, a communication interface 430, and an input/output (I/O) interface 440 as components for executing the energy-aware pruning method according to embodiments of the present disclosure.

The memory 410 is a computer-readable recording medium, and may include permanent mass storage devices, such as a random access memory (RAM), a read only memory (ROM), and a disk drive. In this case, the permanent mass storage device, such as a ROM and a disk drive, may be included in the computer device 400 as a permanent storage device separated from the memory 410. Furthermore, an operating system and at least one program code may be stored in the memory 410. Such software components may be loaded onto the memory 410 from a computer-readable recording medium separated from the memory 410. Such a separate computer-readable recording medium may include computer-readable recording media, such as a floppy drive, a disk, a tape, a DVD/CD-ROM drive, and a memory card. In another embodiment, software components may be loaded onto the memory 410 through the communication interface 430 not a computer-readable recording medium. For example, the software components may be loaded onto the memory 410 of the computer device 400 based on a computer program installed by files received over a network 460.

The processor 420 may be configured to process instructions of a computer program by performing basic arithmetic, logic and input/output (I/O) operations. The instructions may be provided to the processor 420 by the memory 410 or the communication interface 430. For example, the processor 420 may be configured to execute received instructions based on a program code stored in a recording device, such as the memory 410.

The communication interface 430 may provide a function for enabling the computer device 400 to communicate with other devices over the network 460. For example, a request, a command, data or a file generated by the processor 420 of the computer device 400 based on a program code stored in a recording device, such as the memory 410, may be provided to other devices over the network 460 under the control of the communication interface 430. Inversely, a signal, a command, data or a file from another device may be received by the computer device 400 through the communication interface 430 of the computer device 400 over the network 460. A signal, a command or a file received through the communication interface 430 may be transmitted to the processor 420 or the memory 410. A file received through the communication interface 430 may be stored in a storage device (e.g., the aforementioned permanent storage device) which may be further included in the computer device 400.

The communication method is not limited, and may include short-distance wireless communication between devices in addition to communication methods using communication networks (e.g., a mobile communication network, wired Internet, wireless Internet, and a broadcasting network) which may be included in the network 460. For example, the network 460 may include one or more given networks of a personal area network (PAN), a local area network (LAN), a campus area network (CAN), a metropolitan area network (MAN), a wide area network (WAN), a broadband network (BBN), and the Internet. Furthermore, the network 460 may include one or more of network topologies, including a bus network, a star network, a ring network, a mesh network, a star-bus network, and a tree or hierarchical network, but is not limited thereto.

The I/O interface 440 may be means for an interface with an I/O device 450. For example, the input device may include a device, such as a microphone, a keyboard, a camera, or a mouse. The output device may include a device, such as a display or a speaker. For another example, the I/O interface 440 may be means for an interface with a device in which functions for input and output have been integrated into one, such as a touch screen. At least one of the I/O devices 450, together with the computer device 400, may be configured as a single device.

Furthermore, in other embodiments, the computer device 400 may include components greater or smaller than the components of FIG. 4. However, it is not necessary to clearly illustrate most of conventional components. For example, the computer device 400 may be implemented to include at least some of the I/O devices 450 or may further include other components, such as a transceiver and various databases.

As described above, according to embodiments of the present disclosure, filters can be quantified into an energy cost by computing NN derived from SVD, and thus network complexity can be efficiently reduced. A filter can be removed with the least energy from the entire network through NN-based energy-aware pruning, and the best performance can be guaranteed regardless of a dataset of network architecture.

The aforementioned device may be implemented as a hardware component, a software component, or a combination of a hardware component and a software component. For example, the device and component described in the embodiments may be implemented using a processor, a controller, an arithmetic logic unit (ALU), a digital signal processor, a microcomputer, a field programmable gate array (FPGA), a programmable logic unit (PLU), a microprocessor, or one or more general-purpose computers or special-purpose computers, such as any other device capable of executing or responding to an instruction. The processing device may perform an operating system (OS) and one or more software applications executed on the OS. Furthermore, the processing device may access, store, manipulate, process and generate data in response to the execution of software. For convenience of understanding, one processing device has been illustrated as being used, but a person having ordinary skill in the art may understand that the processing device may include a plurality of processing elements and/or a plurality of types of processing elements. For example, the processing device may include a plurality of processors or a single processor and a single controller. Furthermore, a different processing configuration, such as a parallel processor, is also possible.

Software may include a computer program, a code, an instruction or a combination of one or more of them and may configure a processing device so that the processing device operates as desired or may instruct the processing devices independently or collectively. The software and/or the data may be embodied in any type of machine, a component, a physical device, a computer storage medium or a device in order to be interpreted by the processor or to provide an instruction or data to the processing device. The software may be distributed to computer systems connected over a network and may be stored or executed in a distributed manner. The software and the data may be stored in one or more computer-readable recording media.

The method according to embodiments may be implemented in the form of a program instruction executable by various computer means and stored in a computer-readable recording medium. In this case, the medium may continue to store a program executable by a computer or may temporarily store the program for execution or download. Furthermore, the medium may be various recording means or storage means having a form in which one or a plurality of pieces of hardware has been combined. The medium is not limited to a medium directly connected to a computer system, but may be one distributed over a network. An example of the medium may be one configured to store program instructions, including magnetic media such as a hard disk, a floppy disk and a magnetic tape, optical media such as a CD-ROM and a DVD, magneto-optical media such as a floptical disk, a ROM, a RAM, and a flash memory. Furthermore, other examples of the medium may include an app store in which apps are distributed, a site in which other various pieces of software are supplied or distributed, and recording media and/or storage media managed in a server.

As described above, although the embodiments have been described in connection with the limited embodiments and the drawings, those skilled in the art may modify and change the embodiments in various ways from the description. For example, proper results may be achieved although the aforementioned descriptions are performed in order different from that of the described method and/or the aforementioned elements, such as the system, configuration, device, and circuit, are coupled or combined in a form different from that of the described method or replaced or substituted with other elements or equivalents.

Accordingly, other implementations, other embodiments, and the equivalents of the claims fall within the scope of the claims.

The embodiments of the disclosure in which an exclusive property or privilege is claimed are defined as follows:

1. A network pruning method executed by a computer device comprising at least one processor configured to execute computer-readable instructions included in a memory, wherein the method comprises:
    measuring, by the at least one processor, importance scores for output channels through a decomposition approach for quantifying energy of an output channel in a specific layer of a deep learning model; and
    pruning, by the at least one processor, the deep learning model based on the importance scores by removing at least one filter in the specific layer of the deep learning model,
    wherein the decomposition approach for the quantifying energy of the output channel comprises,
    decomposing a channel output of the output channel such that decomposed values that correspond to the output channel are derived, and
    computing quantified energy representing an importance score for the output channel based on the decomposed values.

2. The network pruning method of claim 1, wherein the channel output is decomposed by using singular values decomposition (SVD).

3. The network pruning method of claim 1, wherein the energy of the output channel is quantified by using nuclear-norm (NN) through singular values decomposition (SVD).

4. The network pruning method of claim 1, wherein the decomposing the channel output comprises:
    flattening and concatenating each of filter maps with respect to all inputs; and
    deriving singular values by applying singular values decomposition (SVD) to the flattened and concatenated filter maps,
    wherein the quantified energy is a nuclear-norm (NN) value derived from the singular values.

5. The network pruning method of claim 1, wherein the pruning the deep learning model is performed through a regularization function for minimizing a difference in energy between a pre-trained model as the deep learning model and a model pruned from the deep learning model.

6. A computer device comprises:
    at least one processor configured to execute computer-readable instructions included in a memory,
    wherein the at least one processor is configured to:
    measure importance scores for output channels through a decomposition approach for quantifying energy of an output channel in a specific layer of a deep learning model; and
    prune the deep learning model based on the importance scores by removing at least one filter in the specific layer of the deep learning models,
    wherein the decomposition approach for quantifying energy of the output channel comprises:
    decomposing a channel output of the output channel such that decomposed values correspond to the output channel are derived, and
    computing quantified energy representing an importance score for the output channel based on the decomposed values.

7. The computer device of claim 6, wherein the energy of the output channel is quantified by using nuclear-norm (NN) through singular values decomposition (SVD).

8. The computer device of claim 6, wherein the at least one processor is configured to prune the deep learning model through a regularization function for minimizing a difference in energy between a pre-trained model as the deep learning model and a model pruned from the deep learning model.

9. The computer device of claim 6, wherein the channel output is decomposed by using singular values decomposition (SVD).

10. The computer device of claim 6, wherein the at least one processor is configured to:
    flatten and concatenate each of filter maps with respect to all inputs; and
    derive singular values by applying singular values decomposition (SVD) to the flattened and concatenated filter maps,
    wherein the quantified energy is a nuclear-norm (NN) value derived from the singular values.

* * * * *